June 30, 1942.    J. K. LUND    2,287,810
MIXING VALVE
Filed Dec. 22, 1938    2 Sheets-Sheet 1
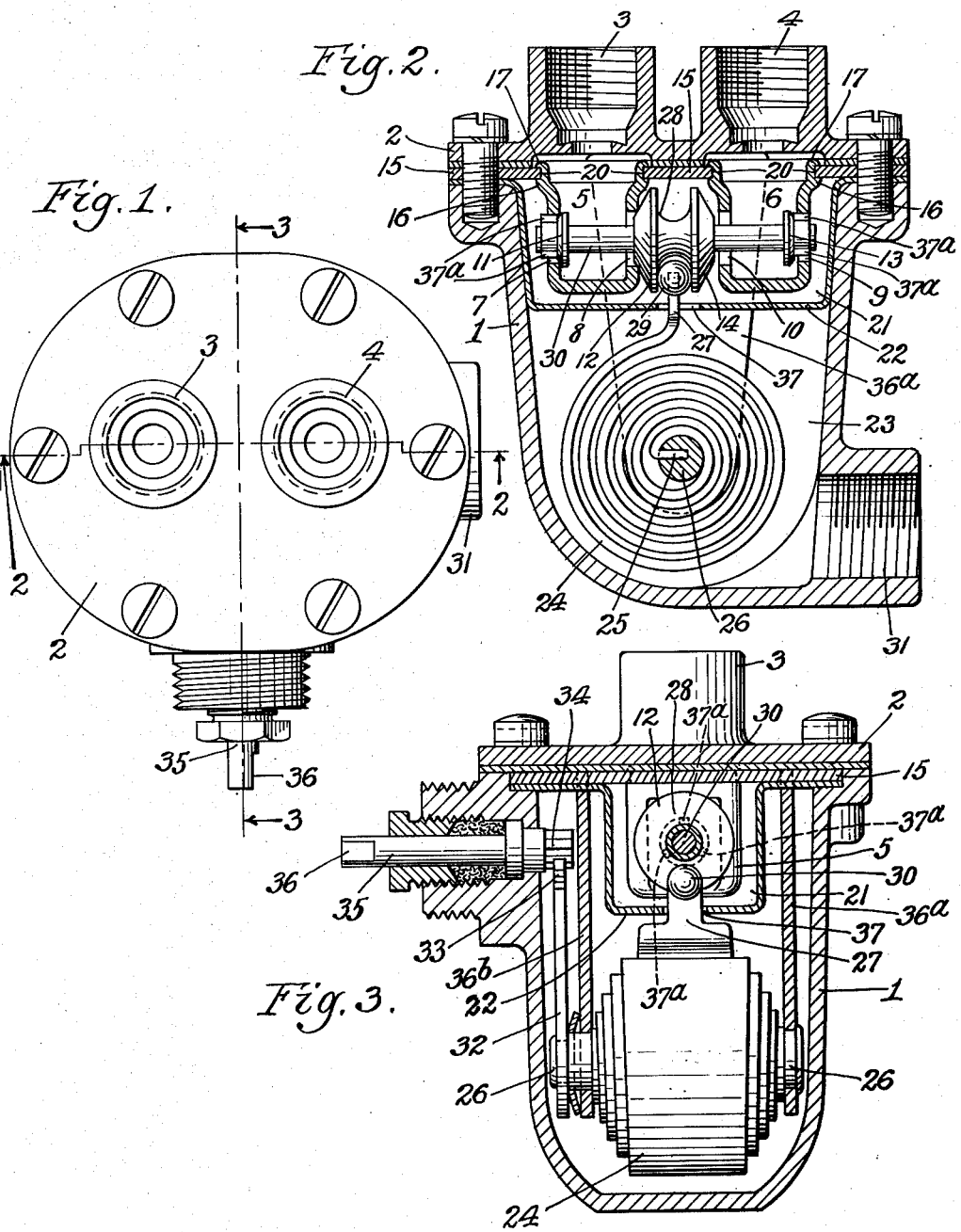
Inventor.
James K. Lund.
by Parker & Carter
Attorneys.

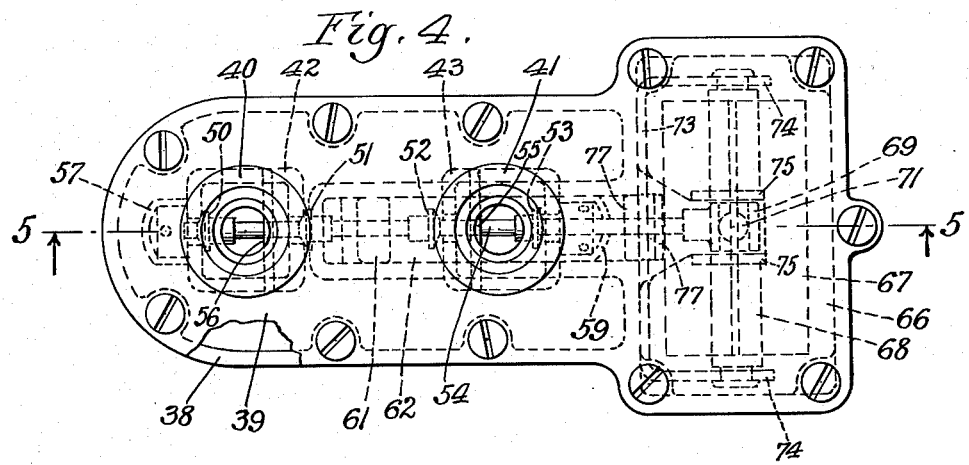
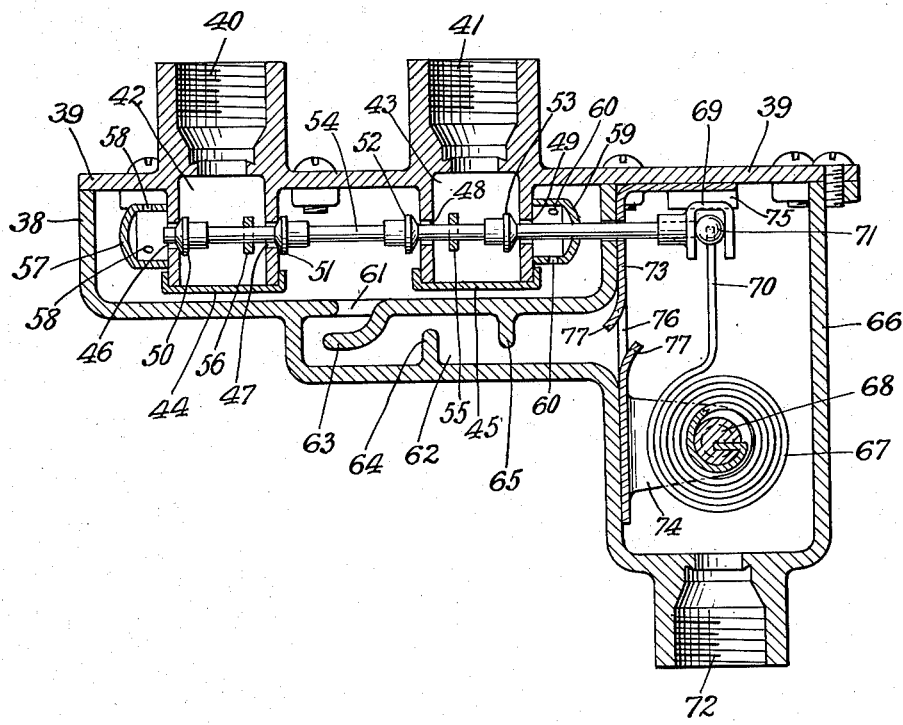

Patented June 30, 1942

2,287,810

UNITED STATES PATENT OFFICE 2,287,810

MIXING VALVE

James K. Lund, Oak Park, Ill., assignor to The Dole Valve Company, Chicago, Ill., a corporation of Illinois Application December 22, 1938, Serial No. 247,265

4 Claims. (Cl. 236—12)

This invention relates to mixing valves and has for its object to provide a new and improved device of this description.

The invention has as a further object to provide a mixing valve for mixing hot and cold fluids wherein two balanced valves are used, one for the hot fluid and the other for the cold fluid. The invention has as a further object to provide such a mixing valve or device operated by a single thermostat which controls the valve for the cold fluid and the valve for the warm fluid.

The invention has as a further object to provide a device of the kind described where the cold and warm fluids enter a chamber containing the thermostatic element which controls the admission of the two fluids. The invention has as a further object to provide a device of the kind described with an easy and effective means for adjusting the thermostat to adjust the temperature of the mixed fluids or liquids passing through the mixing valve.

The invention has further objects which are more particularly pointed out in the accompanying description.

Referring now to the drawings, Fig. 1 is a plan view showing one form of the device;

Fig. 2 is a sectional view taken on line 2—2 of Fig. 1;

Fig. 3 is a sectional view taken on the line 3—3 of Fig. 1;

Fig. 4 is a plan view of the device showing a modified construction; and

Fig. 5 is a sectional view taken on the line 5—5 of Fig. 4.

Like numerals refer to like parts throughout the several figures.

In the construction shown, for example, in Figs. 1, 2 and 3, there is provided a casing consisting of the portion 1 and the cover 2. The cover 2 is preferably removable. The casing is provided with two admission openings 3 and 4 which are connected to the hot and cold water supplies. These admission openings communicate with the receiving chambers or receptacles 5 and 6. The chamber 5 is provided with the ports 7 and 8 and the chamber 6 is provided with the ports 9 and 10. These discharge ports for discharging the hot and cold water from these chambers are controlled by balanced valves and these valves are controlled by a single thermostatic device. In the construction shown, the port 7 is controlled by the valve 11 and the port 8 by the valve 12. The port 9 is controlled by the valve 13 and the port 10 by the valve 14.

The chambers 5 and 6 may be formed in any desired manner. As herein shown, they are made separate from the casing and held in place by the plate 15 which forms a cover plate and which has holes in it. The receptacles 5 and 6 are inserted from the bottom of the plate through these holes until the shoulders 16 on the receptacles strike the lower edge of the plate and then the top portions of the upper edges are turned over, as by spinning, so as to form holding portions 17 which engage the top of the plate. The receptacles are thus held firmly in position by the shoulder 16 and these holding portions 17, see Fig. 2. The walls of the receiving chambers are shown as being provided with grooves 20 into which these holding members fit, as clearly shown in Fig. 2.

There is preferably provided a mixing chamber 21 formed with the wall 22, into which the cold and warm water passes and is mixed as it is discharged from the ports 7, 8, 9 and 10. There is a chamber 23 in the casing in which is located the thermostat 24 which controls the valves for controlling the admission of the hot and cold water. This thermostat may be of any desired form and as herein shown consists of a bimetallic strip formed into a coil, one end 25 of which is connected with a shaft 26. The other end 27 extends in between the valves 12 and 14. In the construction shown these valves have a groove 28 between them and the end 27 of the thermostat extends into this groove. The end of the thermostat is preferably provided with an enlargement 29 in the form of a ball, which is located in this groove.

It will be seen that the valves 12 and 14 perform two functions, one the function of valves and the other the function of means for applying the pressure of the thermostat to the shaft 30 to which all of the valves are connected. Valves 12 and 14 are preferably integral.

The casing is provided with an outlet 31. Some means is preferably provided for adjusting the thermostat in order to adjust the temperature at which the water is discharged from the mixing valve. In the construction herein shown there is attached to the shaft 26 to which the thermostatic element is connected, a member 32 which is provided at its ends with teeth, preferably in the form of a rack 33. This rack engages with a toothed pinion 34 on the shaft 35 which extends through the casing and is provided with an end 36 arranged so that a tool may be applied to it to rotate it. It will be seen that when this shaft is rotated, the shaft 26 with the thermostat, will be rotated in one direction or the other, depending upon the direction of rotation of the shaft 35, and the thermostat adjusted to provide hotter or colder water at the discharge 31.

The wall 22 is provided with an opening 37 through which the water from the mixing chamber passes into the thermostat chamber 23. The end 27 of the thermostat also projects through this opening. It will be noted that the pressure of the water in the chamber 5 presses toward the left on valve 11 and toward the right on valve 12, and the parts are arranged so that these pressures are substantially equal, to provide a balanced valve construction. The pressure of the water in chamber or receptacle 6 presses on the valve 13 toward the right and on the valve 14 toward the left, and the parts are arranged so that these pressures are substantially equal so as to provide a substantially balanced valve construction. By means of this balanced valve construction, the thermostat is not required to overcome the pressure of any the water, its action being confined simply to moving the valves and the shaft and hence, there is no great strain put upon the thermostat and its action is accurate and effective. The water passing into the receptacles 5 and 6 then passes out through the ports when the valves are open and mixes in the chamber 21 and then passes through the opening 37 into the chamber 23, where there is a further mixing of the warm and cold water. This water then acts upon the thermostat 24 so as to cause it to control the valves to secure the desired temperature of the water which is discharged from the discharge opening 31. The thermostat can be regulated by turning the shaft 35 to secure any desired temperature.

The shaft 30 is supported in the port openings by means of the projections 37a.

Figs. 4 and 5 show a modified construction. In this construction there is a casing 38 having a cover 39. This cover is provided with two inlets 40 and 41 for the hot and cold water. These inlets are connected to the chambers or receptacles 42 and 43 which are closed at their ends by the closing pieces 44 and 45. The receptacle 42 is provided with the ports 46 and 47. The receptacle 43 is provided with the ports 48 and 49. The ports 46 and 47 are controlled by the valves 50 and 51. The ports 48 and 49 are controlled by the valves 52 and 53. These valves are mounted upon a sliding shaft or member 54, which is mounted in bearings 55 and 56. The valves 50 and 51 are balanced valves and the valves 52 and 53 are balanced valves. The port 46 has on the outside thereof, an enclosing member 57 which is provided with openings 58 through which the water passes. The port 49 is provided with an enclosing member 59, which is provided with openings 60. These enclosing members act to assist or aid in securing the balancing effect of the valves. The water after passing through the ports in the receptacles 42 and 43, passes through a discharge opening 61 in the casing. There is provided a mixing chamber 62 into which the water passing through the discharge opening 61 passes. This mixing chamber is provided with a series of baffles 63, 64 and 65. This mixing chamber discharges into the enclosing casing 66 of the thermostat 67. One end of this thermostat is connected to a shaft 68 and the other end is connected with the shaft 54 in any desired manner. As herein shown, this shaft is provided with a receiving head 69 into which the end 70 of the thermostat is received. This end 70 of the thermostat is preferably provided with a ball 71. The thermostat 67 may have an adjusting device similar to that shown in Figs. 1, 2 and 3.

When this device is in operation, the thermostat controls the balanced valves both for hot and cold water and the hot and cold water passes through the ports in the receptacles 42 and 43, and then passes through the openings 61 into the mixing chamber 62, the baffles therein thoroughly mixing the warm and cold water. This mixed water then passes into the casing 66 containing the thermostat and surrounds the thermostat, and the temperature thereof acts to cause the thermostat to control the valves to secure the desired temperature of the water. This water is then discharged through the discharge opening 72.

By means of this constructing, including the bringing of the valves 12 and 14 close together so that they act to engage the end of the thermostat, the entire structure can be made very small and yet be fully effective. When the valves 12 and 14 are made integral, the shaft 30 passes through them. It will be noted in this construction that the bolts which hold on the cover, also hold on the cover plate 15 and the part 22. It will further be noted that the shaft 26 of the thermostat is mounted in the supporting members 36a and 36b and that these supporting members are attached to the cover.

I have arranged all of the parts so that they are attached together and to the cover so that when the cover is removed, the entire mechanism comes with it. In other words, the entire mechanism can be inserted or withdrawn as a unit from the casing 1. This permits all the parts to be properly adjusted and calibrated before being placed in the casing and when so adjusted and calibrated, they can be easily and quickly placed in the casing as a unit. When the adjusting device is used, consisting of the part 32 and the shaft 35, it is only necessary to remove the shaft 35 to permit the entire mechanism to be removed or inserted as a unit into the casing 1.

In Figs. 4 and 5, the plate 73 in chamber 66 which furnishes two bearings 74 for the shaft 68, also has guide members 75 at the top, for the head 69, and is apertured opposite the chamber 62, as at 76, with the bent members 77, which assist in the mixing of the hot and cold water.

I claim:

1. A mixing valve comprising an outer casing, a removable cover therefor, two inlets for the water of different temperatures connected with said removable cover, water receiving chambers separate from said casing and said cover into which said inlets discharge, each of said water receiving chambers having two outlet ports and being completely closed except for said inlets and said outlet ports, a single shaft having portions extending into both of said water receiving chambers, four valves on said shaft, one for each of said ports, a mixing chamber into which said water receiving chambers are received, said outer casing being provided with an outlet, a coiled bimetal thermostat in said outer casing, having one end fastened to a normally stationary part inside the casing, said mixing chamber provided with an opening through which the other end of said thermostat projects into the mixing chamber, and means for connecting said end of said thermostat with said shaft so that the thermostat controls the position of said shaft and valves responsive to the temperature of the mixed water.

2. A mixing valve comprising an outer casing, a removable cover therefor, two inlets for the water of different temperatures connected with said removable cover, water receiving chambers separate from said casing and said cover into which said inlets discharge, each of said water receiving chambers having two outlet ports and being completely closed except for said inlets and said outlet ports, a single shaft having portions extending into both of said water receiving chambers, four valves on said shaft, one for each of said ports, a mixing chamber into which said water receiving chambers are received, said outer casing being provided with an outlet, a coiled bimetal thermostat in said outer casing and outside of said mixing chamber, having one end fastened to a normally stationary part inside the casing, said mixing chamber provided with an opening through which the other end of said thermostat projects into the mixing chamber, and means for connecting said end of said thermostat with said shaft so that the thermostat controls the position of said shaft and valves responsive to the temperature of the mixed water, the opening in said mixing chamber through which the end of said thermostat passes, forming the outlet for the mixing chamber through which the mixed water of different temperatures passes to make contact with said thermostat on its way to said outlet.

3. A mixing valve comprising an outer casing, a removable cover therefor, two inlets for the water of different temperatures connected with said removable cover, water receiving chambers separate from said casing and said cover into which said inlets discharge, each of said water receiving chambers having two outlet ports and being completely closed except for said inlets and said outlet ports, a single shaft having portions extending into both of said water receiving chambers, four valves on said shaft, one for each of said ports, a mixing chamber into which said water receiving chambers are received, said outer casing being provided with an outlet, a coiled bimetal thermostat in said outer casing and outside of said mixing chamber, having one end fastened to a normally stationary part inside the casing, the other end of said thermostat being connected with said shaft so as to move said shaft and valves responsive to the temperature of the mixed water, said mixing chamber being provided with an outlet for discharging the mixed water into said outer casing, so as to contact with said thermostatic coil as it passes to the outlet of said outer casing, and a single cover for said water receiving chambers, said mixing chamber and said outer casing.

4. A mixing valve comprising an outer casing, a removable cover therefor, two inlets for the water of different temperatures connected with said removable cover, separate water receiving chambers separate from said casing and said cover into which said inlets discharge, each of said water receiving chambers having two outlet ports and being completely closed except for said inlets and said outlet ports, a single shaft having portions extending into both of said water receiving chambers, four valves on said shaft, one for each of said ports, a mixing chamber into which said water receiving chambers are received, said outer casing being provided with an outlet, a coiled bimetal thermostat in said outer casing and outside of said mixing chamber, having one end connected to said shaft so as to move said shaft and valves responsive to the temperature of the mixed water, the other end of said coiled thermostat being connected with a shaft, two separated supporting members on the interior of said outer casing upon which said thermostat shaft is mounted, said mixing chamber having a discharge through which the mixed water passes into engagement with the thermostatic coil on its way to the outlet in the outer casing, and a single removable cover for said water receiving chambers, fastening devices for fastening the cover to said outer casing, said fastening devices acting also to fasten said mixing chamber and said water receiving chambers in position in the outer casing.

JAMES K. LUND.